United States Patent [19]

Watanabe et al.

[11] Patent Number: 5,494,360
[45] Date of Patent: Feb. 27, 1996

[54] LAYOUT DISPLAY APPARATUS FOR TAPE PRINTING APPARATUS, CAPABLE OF DISPLAYING PLURAL-LINED CHARACTERS AT HIGH SPEED

[75] Inventors: Kenji Watanabe, Tokyo; Yoshiya Toyosawa, Suwa, both of Japan

[73] Assignees: King Jim Co., Ltd.; Seiko Epson Corporation, both of Tokyo, Japan

[21] Appl. No.: 331,907

[22] Filed: Oct. 31, 1994

[30]    Foreign Application Priority Data

Nov. 2, 1993    [JP]    Japan ................................... 5-274487

[51] Int. Cl.$^6$ ....................................................... B41J 3/46
[52] U.S. Cl. ........................... 400/83; 400/615.2; 345/127
[58] Field of Search .................................. 400/83, 615.2; 345/127, 128, 129, 130

[56]    References Cited

U.S. PATENT DOCUMENTS 5,302,038  4/1994  Hirono et al. ...................... 400/615.2
5,344,247  9/1994  Sakuragi ............................. 400/615.2

FOREIGN PATENT DOCUMENTS 2-3099    1/1990  Japan .......................................... 400/83
6-115224  4/1994  Japan ..................................... 400/615.2

OTHER PUBLICATIONS

I.B.M. Technical Disclosure Bulletin vol. 23 No. 9 Jan. 1981 p. 3793.

*Primary Examiner*—Ren Yan
*Assistant Examiner*—Steven S. Kelley
*Attorney, Agent, or Firm*—Oliff & Berridge

[57]    ABSTRACT

A major factor of workloads for a user in a tape printing apparatus to execute a layout display is to confirm whether or not line end positions of the respective lines of an inputted sentence are aligned with each other. The inputted sentence is displayed at fixed positions for every line irrelevant to a print image (layout) along the main scanning direction, and also is displayed along the sub-scanning direction in such a layout manner that a mixed print image with a character portion and a background portion for every lien is faithfully laid out and displayed. As a consequence, the print image process operations effected in the respective portions of a layout display apparatus can be made simple, and thus a high-speed layout display can be achieved.

4 Claims, 4 Drawing Sheets

THICK LINE : MAIN SCANNING COMPRESSION DOT NUMBER

SENTENCE SECTION 1 ↔ SENTENCE SECTION 2

23a DOT EXPANSION BUFFER

FIRST LINE
SECOND LINE
THIRD LINE
FOURTH LINE

23b DISPLAY BUFFER

| LINE NUMBER / DISPLAY DOT POSITION | ONE LINE | TWO LINES | THREE LINES | FOUR LINES |
|---|---|---|---|---|
| FIRST LINE | EIGTH DOT | 6 | 4 | 3 |
| SECOND LINE | — | 11 | 9 | 7 |
| THIRD LINE | — | — | 14 | 11 |
| FOURTH LINE | — | — | — | 15 |

LAYOUT DISPLAY APPARATUS FOR TAPE PRINTING APPARATUS, CAPABLE OF DISPLAYING PLURAL-LINED CHARACTERS AT HIGH SPEED

BACKGROUND OF THE INVENTION

The present invention generally relates to a layout display apparatus for displaying a print image (layout) and, more particularly, is directed to a layout display apparatus for a tape printing apparatus capable of forming a label on which an inputted sentence having one line or more is printed out.

A tape printing apparatus prints out an inputted character (conceptionally containing a symbol) string having one line or more on a continuous tape, if required, and also cuts the printed tape to be ejected therefrom. This inputted character string will be referred to as a "sentence". Recently, such a tape printing apparatus capable of printing out not only the sentence having 1 line, but also the sentence having two lines or more on a cut tape (hereinafter referred to as a "label") has been proposed, taking account of such a fact that the label may be utilized in various fields.

Also in such a tape printing apparatus, like other information processing apparatuses having printing functions such as wordprocessors, a layout display apparatus for displaying a printed image is mounted. Therefore, users may confirm the arrangement or the like of the printing content of the label to be formed by way of the layout display without printing out the inputted sentence on the expensive tape, while operating the layout display apparatus.

On the other hand, the tape printing apparatuses are made compact and lower in cost, as compared with other information processing apparatuses, and moreover may merely display an entire portion or a part of a sentence having several lines. Accordingly, the display regions of the display units (for example, liquid crystal displays) provided for the tape printing apparatuses are typically small. Since the dot number of the printing head would give influences to printing qualities, the total dot number thereof should be selected to be a sufficient value capable of maintaining the required printing qualities. However, actually, the total dot number of such a display unit is set to a limited number because of the requirement for its compactness and low cost. For instance, even when the total dot number of the printing head is selected to be 62 dots or 96 dots, the size of the display area of the display unit is selected to be almost 16 dots (in a main scanning direction)×48 dots (in a sub-scanning direction), or 16 dots×96 dots. As to the tape functioning as the printing medium, the length of this tape along the width direction (the main scanning direction) is fixed, whereas the length thereof along the longitudinal direction (the sub-scanning direction) is not fixed but may be cut at a proper length, depending upon the length of the inputted sentence, which is completely different from the printing media employed in other apparatuses.

Since the tape printing apparatus owns such a specific feature, as compared with other information processing apparatuses, the layout display unit mounted on this tape printing apparatus is different from that mounted on other information processing apparatuses.

The conventional layout display apparatus mounted on the tape printing apparatus will now be described briefly.

When a selection key for a layout display function is manipulated under such a condition that the inputted sentence is displayed on the display unit, the operation thereof is entered into a layout display mode. Then, a user will confirm the width of the tape loaded on the tape printing apparatus at this time, and further will recognize various attributes such as the character sizes of the inputted sentence for each line, and the printing styles (right-justification printing, constant-length printing or the like), so that the input sentence is expanded into a dot expansion buffer with employment of the font information stored in a character generator ROM (CG-ROM). This sentence expansion is similar to the expansion used for the printing. The dot pattern expanded in this manner is converted at the reduction rate determined by the size of the display area of the display apparatus, and thereafter, the reduction-converted dot pattern is stored into the display buffer. For example, the dot pattern is reduction-converted in order that the dot number of the display apparatus along the main scanning direction corresponds to the tape width. In the display apparatus, after the head portion of the pattern information stored in the display buffer is displayed, the entire pattern information is displayed in the scrolling manner along the left direction. When the layout content at the end position along the longitudinal direction of the printing tape is displayed, the scrolling display is accomplished. Thus, the layout display is performed.

The capacities of the dot expansion buffer and the display buffer are not so large, and both the dot expanding operation and the pattern reduction conversion or the like may be repeated in conjunction with the layout display during the layout display operation period.

As described above, in the conventional layout display apparatus, the dot pattern is converted at the reduction rate in accordance with such a fact that the total dot number of the display apparatus along the main scanning direction is smaller than the total dot number of the printing head. Further, this layout display apparatus employs the scrolling display in correspondence with such a fact that the lengths of the printed labels along the sub-scanning direction are different from each other for each of the inputted sentences.

SUMMARY OF THE INVENTION

However, since the dot pattern expanding operation, the reduction converting operation, and the scroll display operation must be sequentially carried out, or carried out in the parallel mode in the conventional layout display apparatus, there are lots of process operations executed by a CPU of the layout display apparatus. Thus, there is a drawback that a relatively long time period is required until the layout display operation is accomplished.

More specifically, the conventional tape printing apparatus usually employs a cheap CPU with a slow processing speed, since the tape printing apparatus is required to be cheaper than other information processing apparatus, e.g., a wordprocessor. Therefore, the CPU must have such a heavy workload, while performing plural sorts of processing operations in the parallel mode, so that a lengthy layout display time period is necessarily required.

To avoid such a difficulty, there is another conventional layout display method such that the shapes of the respective characters are neglected and then these characters are laid out and displayed as the rectangular shapes. However, also in this latter layout display manner, plural sorts of process operations should be carried out, whereby the above-mentioned difficulty may be solved only to some extent.

The present invention has been made in an attempt to solve the above-explained problems, and therefore has an object to provide a layout display apparatus employed in a tape printing apparatus capable of executing a layout display at high speed.

In order to achieve this object, according to one aspect of the present invention, there is provided a layout display apparatus for a tape printing apparatus for printing out a character string having more than 1 line of an inputted sentence on a tape, and for cutting the printed tape to be ejected therefrom, the layout display apparatus includes: (1) an information determining unit for determining (a) a reduction rate used to correspond a display size along a sub-scanning direction with a display width along a main scanning direction, (b) a display position along the main scanning direction in each line of the sentence, the display position being defined in accordance with the line number of the inputted sentence, and (c), when assuming that the characters in each line of the sentence are in the shape of rectangles, dot numbers corresponding to lengths of the rectangles along the sub-scanning direction; (2) a dot expansion unit for expanding the respective lines of the inputted sentence to dot patterns based on the fixed dot number irrelevant to the shapes of the respective characters along the main scanning direction, and also based on the dot number determined by the information determining unit along the sub-scanning direction; (3) a display content storage unit for (a) reducing the dot patterns of the respective expanded lines at the reducing rate determined by the information determining unit only along the sub-scanning direction, and (b) arranging the reduced dot patterns of the respective lines on the display position determined by the information determining unit to thereby store into a display buffer; and (4) a display unit for displaying the contents of the reduced dot patterns stored in the display buffer.

In the above-described layout display apparatus, the major factor required by the user for the tape printing apparatus when the layout is displayed, is to confirm whether or not the end positions of the respective lines are aligned with each other. In accordance with the layout apparatus of the present invention, the layout display along the main scanning direction is performed irrelevant to the printing image (layout), whereas the layout display along the sub-scanning direction is carried out so as to faithfully reflect the mixed printing image with the character portions and the background portions. As a result, the printing image processing operations effected in the layout display apparatus can be simplified and the layout display can be performed at high speed.

The display content storage unit subdivides the expanded dot patterns of the respective lines along the sub-scanning direction for every preselected dot number in accordance with the reduction rate, and converts each of the subdivided dot pattern portions into 1 dot to thereby reduce the expanded dot patterns of the respective lines along the sub-scanning direction. The converted 1 dot represents a character when there is at least one dot indicative of the character in the sub-divided dot pattern portion.

In this case, the mixed format with the character portion and the background portion in the printing image is not lost during the dot pattern reduction. That is, as the method for reducing/converting the respective subdivided dot pattern portions into 1 dot, there is such a method for deriving 1 dot of each of the subdivided dot pattern portions at a preselected position. However, this method may readily lose the mixed format with the character portion and the background portion in the printing image during the reduction process. Therefore, even when 1 dot representative of the character is contained in the subdivided dot pattern portion, the reduced 1 dot preferably represents the character.

The layout display apparatus further includes a line number/respective line position converting table indicating a correspondence relationship between the line number of the inputted sentence and the display positions of the respective lines of the sentence along the main scanning direction. Then, the information determining unit may determine the display positions of the respective lines of the sentence along the main scanning direction with reference to the line number/respective line position converting table. In this case, the display positions of the respective lines of the sentence along the main scanning direction may be easily determined at high speed.

Furthermore, the layout display apparatus further includes a tape width detecting unit for detecting a width of a tape loaded on the tape printing apparatus. The information determining unit may determine the reduction rate in response to the width of the loaded tape and the display width along the main scanning direction.

In this case, although the size or dimension of the printing image along the main scanning direction is not correctly laid out and displayed by the layout display apparatus of the present invention, the size of the display region along the main scanning direction corresponds to the tape width, and the display reduction rate as to the sub-scanning direction may be preferably determined in accordance with the size of the display region along the main scanning direction.

BRIEF DESCRIPTION OF THE DRAWINGS

FIG. 4 is an explanatory diagram for explaining contents of a line number/line position conversion table of FIG. 2.

DETAILED DESCRIPTION OF THE PREFERRED EMBODIMENTS

Referring now to the accompanying drawings, a description will be made of a layout display apparatus according to the present invention.

First, an overall arrangement of a tape printing apparatus to which a layout displaying apparatus according to an embodiment of the present invention is applied, will now be described with reference to a functional block diagram of FIG. 2.

Figure 2:
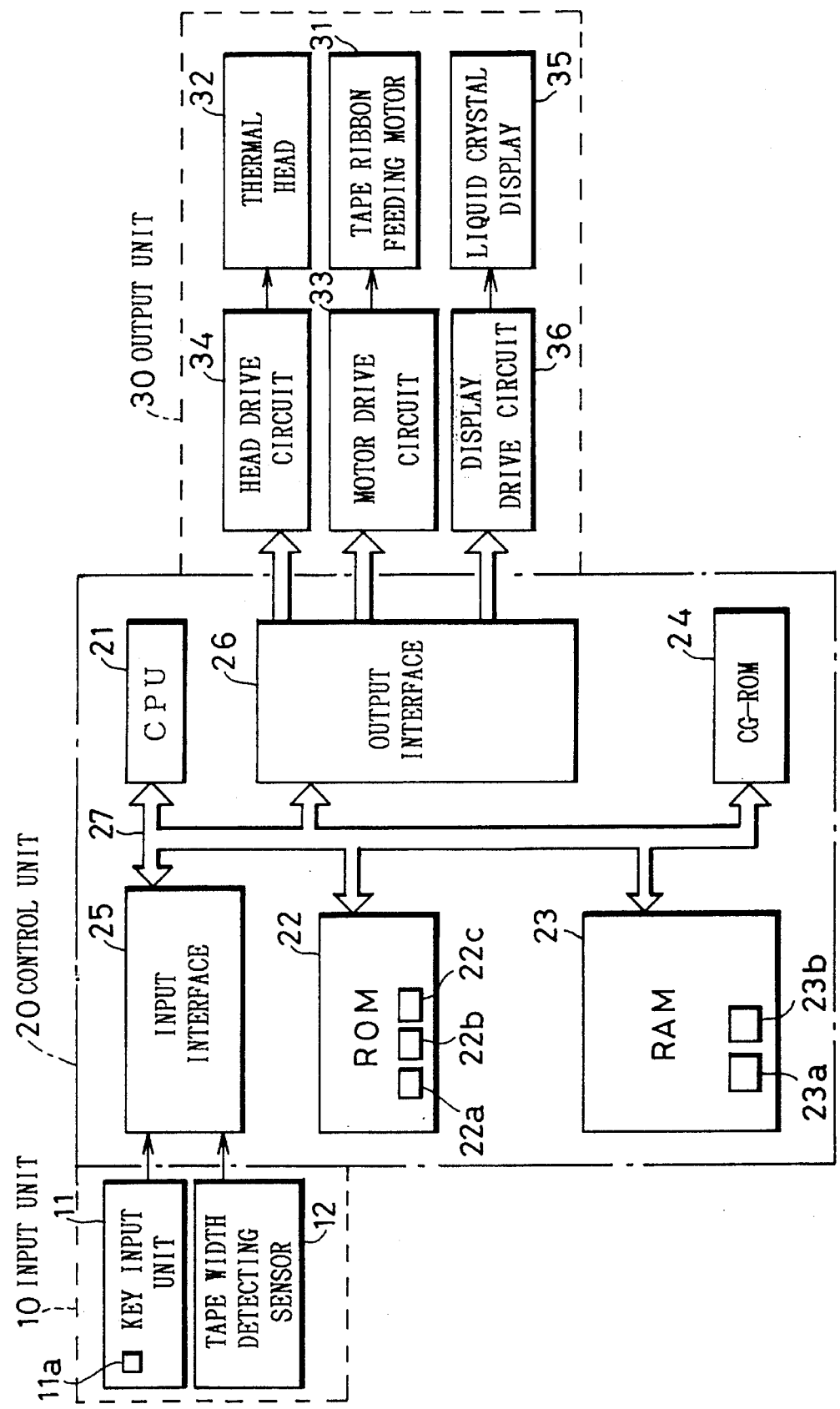
FIG. 2 is a functional block diagram for representing an arrangement of a tape printing apparatus on which the layout display apparatus of FIG. 1 is mounted.

In FIG. 2, this printing apparatus is mainly constructed of an input unit 10, a control unit 20, and an output unit 30 in a similar manner to other information processing apparatuses such as wordprocessors. The control unit 20 executes various process operations in accordance with various information supplied from the input unit 10 and various processing stages or the like. Then, the processing results are displayed, or printed out in the output unit 30.

The input unit 10 is arranged by a key input section 11 equipped with a depression key and a dial key (detailed constructions thereof will be omitted) or the like, and a tape width detecting sensor 12.

The key input unit 11 is to produce character code data and various sorts of control data, which are supplied to the control unit 20. In this embodiment, a key 11a for designating a layout display is provided as a key for producing the control data.

The tape width detecting sensor 12 detects a width of a mounted tape to produce tape width information which will then be supplied to the control unit 20. In a practical case, a tape is accommodated into a tape cartridge. A physically discriminable element such as a hole used to define a tape width is formed on the tape cartridge, and the tape width detecting sensor 12 reads this physically discriminable element to output the tape width information.

The output unit 30 is constructed by a printing section and a display section. A tape ribbon feeding motor 31 constructed of, for instance, a stepping motor feeds a tape (not shown) and an ink ribbon (not shown), which are mounted, to a predetermined printing position, and outside the tape printing apparatus. A printing head such as a thermal head 32 is fixed to print out information on the traveling tape by the thermal transfer function, and is capable of printing out the information of 96 dots at the maximum simultaneously, for example. These tape ribbon feeding motor 31 and thermal head 32 are driven by a motor drive circuit 33 and a head drive circuit 34 under the control of the control unit 20. The printed tape is cut by a cutter (not shown) driven by a motor (not shown) or user's force.

In the tape printing apparatus according to this embodiment, a liquid crystal display 35 is employed as the display unit. Under the control of the control unit 20, this liquid crystal display 35 is driven by a display drive circuit 36. The liquid crystal display 35 is so arranged that an input character string, various sorts of attribute information, and print images at the time of layout display are directly displayed, and also that an indicator is turned on which corresponds to the character string indicative of the attribute described around the display 35 of the layout display apparatus. The liquid crystal display 5 is constructed of, for instance, 16 dots along the width direction, which are selected to be smaller than the dot number (e.g., 96 dots) of the thermal head 32. In other words, the liquid crystal display 35 cannot display the print image in a layout form at the same magnification.

The control unit 20 is composed of, for example, a microcomputer in which a CPU 21, a ROM 22, a RAM 23, a character generator ROM (CG-ROM) 24, an input interface unit 25, and an output interface unit 26 are connected via a system bus 27.

In the ROM 22, such fixed data as various sorts of process programs and dictionary data for performing Kana characters/Kanji characters conversion have been stored. The RAM 23 is employed as a working memory, and stores fixed data related to the user input data. The RAM 23 is back-up biased even when the power supply is turned OFF.

In this embodiment, the ROM 22 stores a layout displaying program 22a, information representing a compression dot number in the main scanning direction (which will be discussed later) determined by a character size or the like and a table 22c. The table 22c stores information representing a relationship between the line number of the input sentence and the dot position in the main scanning direction driven during displaying of the layout. When the layout displaying program 22a is executed, a dot expansion buffer 23a and a display buffer 23b are formed and prepared as a work area in the RAM 23.

The CG-ROM 24 stores font information about the characters and symbols prepared in this tape printing apparatus, and when code data specific to either a character or a symbol is given, the corresponding font information is read out therefrom. It should be noted that the font information stored in the CG-ROM 24 may be either an outline font or a bit map font. In this embodiment, this CG-ROM 24 is not utilized when the layout is displayed.

The input interface unit 25 interfaces various data between the input unit 10 and the control unit 20.

The output interface unit 26 interfaces various data between the output unit 30 and the control unit 20.

The CPU 21 executes the process program stored in the ROM 22, which is determined in accordance with the input signal supplied from the input unit 10 and also the processing stage by properly employing the fixed data stored in the ROM 22 and the RAM 23, if required, while the RAM 23 is utilized as the working area. The CPU 21 further causes the processing conditions and the processing results or the like to be displayed on the liquid crystal display 35, or to be printed out on the tape (not shown).

Operations of the layout display apparatus according to this embodiment will now be described with reference to FIG. 1, FIGS. 3A to 3C and FIG. 4 in addition to FIG. 2.

Figure 1:
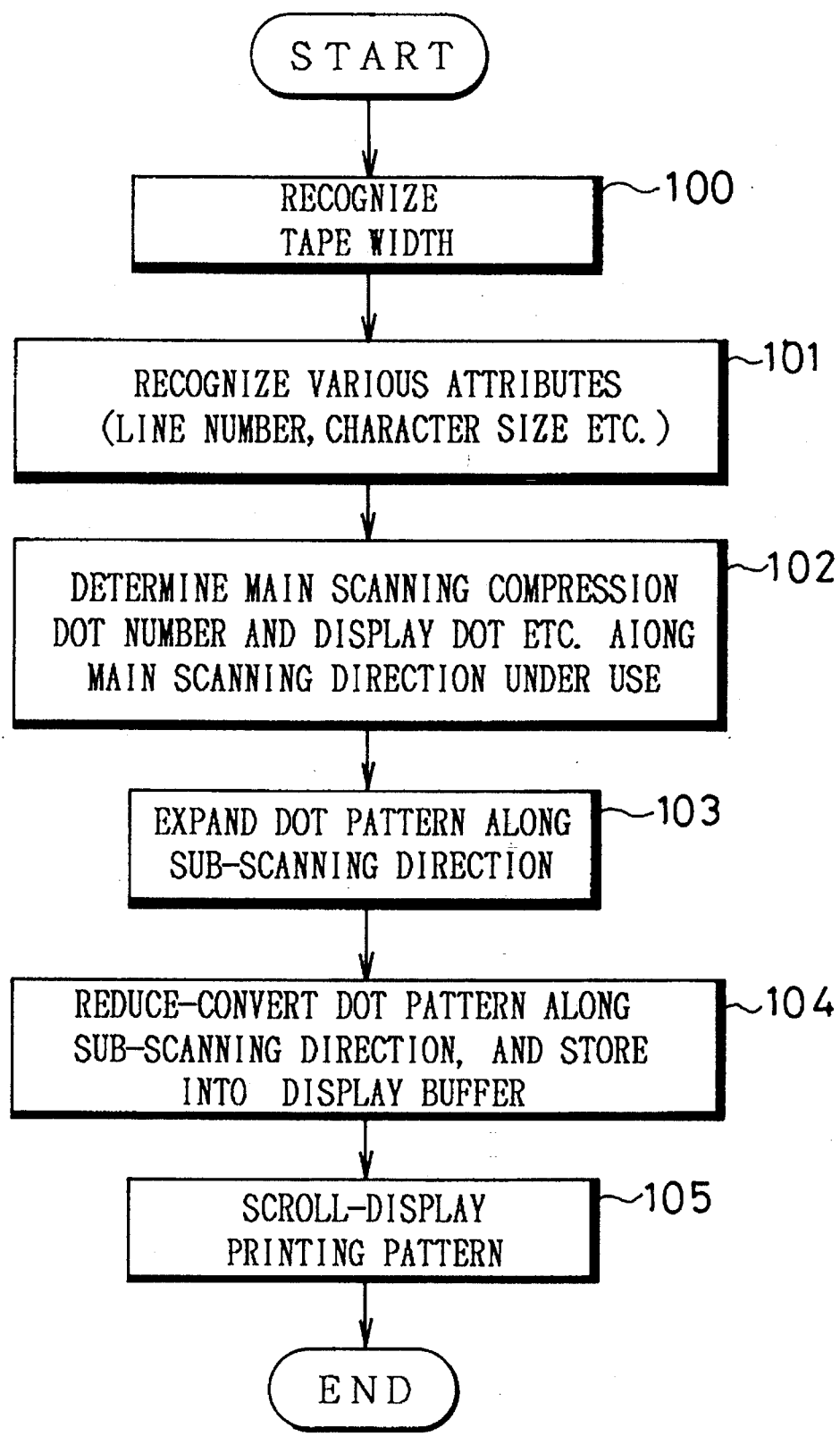
FIG. 1 is a flow chart showing a process operation of a layout display apparatus according to an embodiment of the present invention.
Figure 3A:
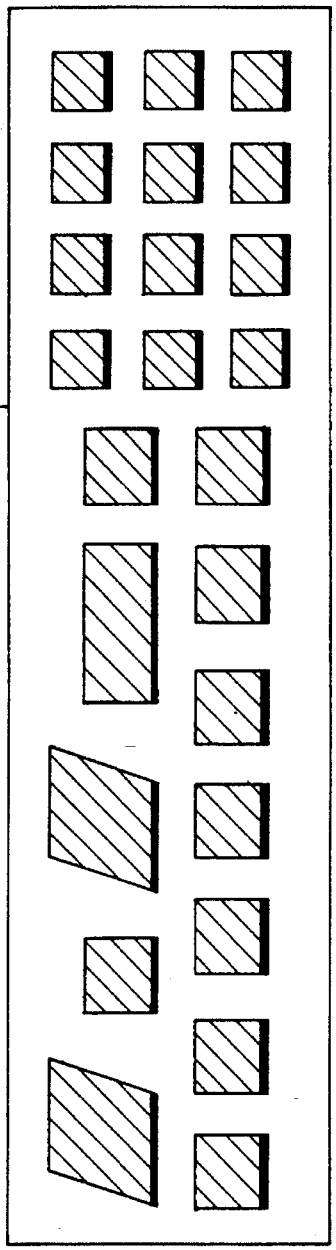
FIGS. 3A to 3C are explanatory diagrams for explaining storage contents of a buffer employed in the tape printing apparatus shown in FIG. 2 during a layout display operation.
Figure 3B:
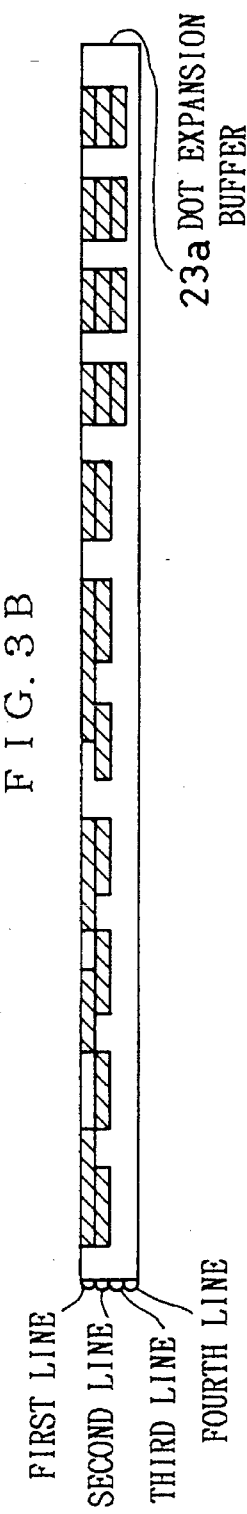
Figure 3C:
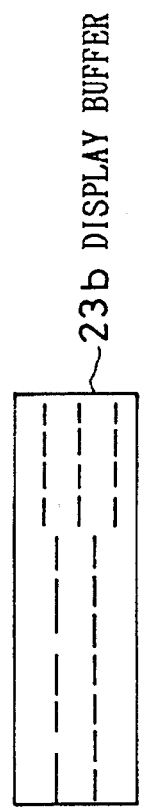

It should be understood that FIG. 1 is a flow chart for showing the layout display operation according to this embodiment, and FIG. 3A to FIG. 3C are explanatory diagrams for explaining contents of the buffer storage during the layout display operation. FIG. 4 is an explanatory diagram for explaining a relationship between a line number of an input sentence and a dot position of the liquid crystal display 35 driven during displaying of a layout along the width direction (the main scanning direction).

When a key 11a for designating a layout representation is operated by a user, the CPU 21 starts to execute the layout displaying program 22a shown in FIG. 1. As a consequence, the dot expansion buffer 23a and the display buffer 23b which are related to the layout representation are also formed and prepared in the RAM 23. It should also be noted in this embodiment that only when the input sentence is displayed on the liquid crystal display 35, an instruction to display the layout is acceptable, whereby the layout displaying program 22a indicated in FIG. 1 is started to be executed.

In the flow chart of FIG. 1, upon starting this layout displaying program 22a, the CPU 21 acquires the width information of the loaded tape from the tape width detecting sensor 12 (step 100). Subsequently, the CPU 21 will recognize the attribute information attached to the input sentence (step 101), and then determine various sorts of data required in the following process operations based upon the above-described tape width information, attribute information and information concerning the input sentence (step 102).

It should be understood that the attribute information recognized at step 101 is substantially similar to the attribute information recognized during the printing process operation and includes, for instance, the character sizes for each line, or each character, the modification of characters, the character pitches, the line number, the vertical/horizontal printing styles, and so on. However, during the layout display operation of this embodiment, the CPU 21 does not recognize a half-tone dot meshing and a surrounding horizontal rule due to different operations from the printing process operation. This is because a simple layout (printing image) representation is intended in this embodiment, and thus both the half-tone dot meshing and the horizontal rule are omitted in the layout representation. When the character size is designated as relative values (for example, designations of "large, large and small" are made of sizes of three-line characters), the character size is modified into absolute values in accordance with the tape width information.

It should also be noted that when the tape is not loaded, such a message that a layout display is not executed may be displayed on the liquid crystal display 35, whereby a series of process operations may be forcibly accomplished. Alternatively, a process operation may be executed by recognizing that a tape having a minimum width, or a maximum width is loaded.

In step 102, the data which are determined from the tape width information and the attribute information, correspond to the dot member of the main scanning compression under use, the compression rate along the sub-scanning direction, the display dot position along the main scanning direction and the label length or the like.

As an initial condition of the layout representation according to this embodiment, the shapes of the respective characters are out of question, and the process operation is carried out by recognizing that the respective characters are rectangular shapes (parallelogram in a case of oblique character) as illustrated in FIG. 3A. It should be noted that FIG. 3A is not intended to explain the operation of the layout display apparatus, but to conceptionally explain the above-described initial condition. In this embodiment, it is decided that the size information about the respective characters along the main scanning direction is not involved in the layout display (although it may be judged to some extent from information along the sub-scanning direction). As a consequence, it may be sufficient to employ only the size information along the sub-scanning direction. Therefore, the information 22b about the main scanning compression dot number is stored into the ROM 22, which defines only the character size (whether it is oblique character or not) and the size along the sub-scanning direction determined by the top-to-bottom writing and the left-to-right writing. Then, the dot number of the main scanning compression is determined which is utilized in the present layout display.

In the case of the left-to-right writing, for instance, a dot number of a bottom side of a rectangle (i.e., parallelogram for oblique character) related to a character having a basic character size in this line is prepared for the dot number of the main scanning compression. In the case of the top-to-bottom writing, a dot number of a right side of a rectangle (i.e., height of parallelogram for oblique character) related to a character having a basic character size in this line is prepared for the dot number of the main scanning compression.

It may be conceived that the rectangular shape as shown in FIG. 3A is compressed along the main scanning direction(by performing logical multiplication) to produce the main scanning compression dot number. However, when such a process is employed as a part of the layout display process, the high-speed process for the layout display could not be realized to which the present invention is directed. As a consequence, it is preferable that the main scanning compression dot number is previously formed and then stored in the ROM 22.

In this embodiment, although no size information along the main scanning direction is supplied to display the layout, the size of the liquid crystal display 35 along the width direction (namely, the main scanning direction) corresponds to the tape width in one-to-one correspondence. As a result, when the maximum dot number (dot number corresponding to the tape width) capable of printing by the thermal head 32 is, for example, 80 dots, if the layout is displayed by the liquid crystal display 35 having 16 dots along the width direction, then compression of ⅕ is required. In this case, since the size along the main scanning direction is not taken into consideration, this compression rate may be applied only to the sub-scanning direction. Such a compression rate along the sub-scanning direction is determined in the above-described manner.

As previously explained, since the size in the main scanning direction is not involved in the layout display, there is no problem even when the display positions of the respective lines along the main scanning direction are fixed. However, when the display positions of the respective lines are made identical to each other even in the case of displaying different number of lines, such line displays would strike users as incongruous. Namely, the display positions in the first line and the second line within 2-line sentence are made the same as the first and second lines within 4-line sentence, which would give a sense of incongruity to users. Accordingly, in this embodiment, the display fixing positions of the respective lines along the main scanning direction are varied in accordance with the line number of the sentence, and then such information is previously stored as the table 22c in the ROM 22. FIG. 4 schematically indicates an example of storage contents of the table 22c in the case that the dot number of the liquid crystal display 35 along the width direction is 16. As a result, at step 102, a decision is made of the display positions along the main scanning direction in accordance with the line number of the presently printed sentence.

Furthermore, at step 102, a length of a label (also corresponding to information for defining length of layout display along the sub-scanning direction) is decided based on character size of each line and character number.

It should be noted that, in a tape printing apparatus where a character size is given as an absolute value, it may also be determined whether or not a printing operation can be executed within a width of a loaded tape at such a decision step 102. For example, either when the print region is not stored within the tape width, or when the tape is not loaded, a non-inverting/inverting display flag may be set in such a manner that display colors of a background portion and a character portion (white and black display colors) are reversed with respect to those of the normal layout representation.

As previously explained, when the various sorts of data are determined, the CPU 21 sequentially performs a dot expansion process (step 103) for the dot expansion buffer 23a along the sub-scanning direction, processes of reduction-conversion along the sub-scanning direction and of storage into the display buffer 23b (step 104), and a scroll process (step 105) by the liquid crystal display 35. These three sorts of processings may be executed in parallel by time division based on the clock number.

The dot expansion process (step 103) for the dot expansion buffer 23a along the sub-scanning direction is performed in the following manner, for example.

In this embodiment, since the size of the layout display along the main scanning direction is not taken into consideration, it is sufficient for the dot expansion buffer 23a to prepare such a buffer having information corresponding to the length along the sub-scanning direction that is corresponding to the label length. As shown in FIG. 3B, as to the main scanning direction, it is sufficient to employ such a dot expansion buffer capable of discriminating lines along the main scanning direction.

When, as shown in FIG. 3A, the sentence contains sections (sentence sections) whose line numbers are different from each other, the CPU 21 performs the expansion process for every sentence section. For instance, as to the first line of the sentence section on the side of the sentence head, after the dot number of the tape blank portion on the side of the sentence head is secured as background, the main scanning compression dot number corresponding to the character size of the first character is employed as the object to be displayed. Then, while the dot number corresponding to the character spacing pitch is employed as a background, the main scanning compression dot number corresponding to the character size of the second character is employed as the object to be displayed, and thereafter a similar expansion process is repeatedly performed. A similar expansion process will be executed for the second line. When the expansion process of the first sentence section is accomplished, if there is a subsequent sentence section, then a similar process operation to the above expansion process is carried out with respect to a region of the dot expansion buffer 23a subsequent to the ending position of the first sentence section. It should be noted that FIG. 3B schematically shows such a condition that the label having the print contents shown in FIG. 3A is expanded into the dot expansion buffer 23a in a case when a character is expressed in a rectangular shape. It should be understood that the respective lines of the sentence have been expanded with the fixed dot number along the main scanning direction, which fixed dot number is irrelevant to the respective character shapes, by performing such a process.

The reduction converting process along the sub-scanning direction and the storage process to the display buffer 23b (step 104) are carried out as follows. After the CPU 21 makes a confirmation of the display dot position of the first line of the first sentence section along the main scanning direction, the CPU 21 retrieves the logic value of the number of the dot expansion buffer 23a, which corresponds to the inverse number of the determined reduction rate. Then, a value indicating whether it is a background dot, or a character dot is obtained by performing the logic calculation of this logic value and thereafter stored into the display buffer 23b. In this respect, an OR operation is performed when character dot corresponds to "1", whereas an AND operation is performed when character dot corresponds to "0". Subsequently, the logic calculations and the storage operation into the display buffer 23b are repeated for each number.

When the reduction rate is ⅓, if the values of the three dots continued along the sub-scanning direction and stored in the dot expansion buffer 23a are "000" ("0" indicates a background portion ), a single "0" indicative of the background portion is stored into the display buffer 23b. If the continuous values of three dots contain even one value "1" representative of the character portion, then a single "1" indicative of the character portion is stored into the display buffer 23b. Thus, the ⅓ reduction conversion along the sub-scanning direction and the storage into the display buffer 23b are carried out. A similar process operation is performed for other lines and also for other sentence sections.

As a result, when the above-described process operations are completed, as illustrated in FIG. 3C, a printing content is stored into the display buffer 23b, which printing content has the fixed size along the main scanning direction (namely, no character size information along main scanning direction) and has the reduced size by a preselected reduction rate along the sub-scanning direction.

It should also be noted that when the inversion display flag is set due to such a reason that the printing region exceeds the tape width, the logic values for the background portion and the character portion may be inverted when these values are stored into the display buffer 23b.

In the scroll process (step 105), the following series of layout display process is carried out. That is, the input sentence data stored in the display buffer 23b, which owns the length equal to the longitudinal length in the sub-scanning direction of the liquid crystal display 35, is read out and then displayed as the initial image for a predetermined time period defined by a timer employed in the CPU 21. Thereafter, other input sentence data are scroll-processed by successively changing the read address from the display buffer 23b, and this scroll operation is stopped at such a timing when the content of the final position of the display buffer 23b along the sub-scanning direction is displayed at the right edge of the liquid crystal display 35. After the final image has been displayed for a predetermined time period defined by the timer of the CPU 21, the content of the input sentence when the layout display is designated is displayed on the liquid crystal display 35, and thus this series of the layout display process is accomplished.

In accordance with this embodiment, since the input sentence is laid out and displayed in such a manner that the size of the input sentence along the main scanning direction is fixed and the size of the input sentence along the sub-scanning direction is faithfully adapted to the print image (mixed image with the character portion and the background portion), the layout display process can be simply performed as compared with the conventional layout display process. Therefore, even if a low-speed CPU is employed, the resultant layout display process can be completed shorter than that by the conventional layout display process.

Furthermore, as previously explained, the input sentence is laid out and displayed in such a manner that the print image concerning the main scanning direction is not faithfully reflected in accordance with this embodiment. However, the major factor what the user wants to lay out and display the input sentence by the tape printing apparatus, is to confirm that the end positions of the respective lines are aligned with each other, and the confirmation reaches more than 90% in actual layout display. Under such a practical condition, such a layout display function achieved by the tape printing apparatus according to the embodiment can satisfy the major factor desired by the user, and it may be understood that the conventional layout display function would give such an excessive service to the user.

Further, according to the embodiment, when the several expanded dots are converted into 1 dot to achieve the reduction, if even 1 dot of the character portion is contained in the several dots, then the reduced 1 dot also represents the character portion. As a consequence, the user can properly judge the end position alignment for the character portions contained in the respective lines, and also can perform better judgement of a positional relationship among the character portions of the respective lines.

Furthermore, in accordance with the embodiment, since the display positions of the respective lines along the main scanning direction are determined by employing the table 22c, the high-speed layout process operation can be achieved due to this view points.

In addition, according to the above-explained embodiment, the width of the loaded tape is made in correspondence with the width of the liquid crystal display 35 along the main scanning direction, and further the reduction ratio along the sub-scanning direction is set to the ratio of the width of the loaded tape to the width of the liquid crystal display 35 along the main scanning direction. As a result, the display region corresponds to the tape size in an one-to-one correspondence, so that the user can easily observe the resultant layout display.

While the present invention has been described in detail as to the one embodiment, the present invention is not limited to the above-described embodiment, but may be modified and changed without departing from the scope of the invention.

For instance, while, in the above-described embodiment, the dot-expanded dot pattern is once stored in the dot expanding buffer 23a, the dot-expanded dot pattern may be directly compression-converted and then may be stored into the display buffer 23b.

Also, in the above-described embodiment, the tape printing apparatus is equipped with the exclusively used key 11a for designating the layout display. The layout display may be represented as a part of menu to select the desired layout by using a general-purpose key. Alternatively, the layout display is not executed by employing such a key, but when a printing instruction is issued, the layout display may be automatically performed to which the user will made a confirmation. Thereafter, the printing process may be executed.

In the above-described embodiment, the size of the liquid crystal display 35 along the width direction (along the main scanning direction) corresponds to the tape width in an one-to-one correspondence. Since the size of the liquid crystal display 35 along the main scanning direction has no relationship with the layout display, only the print image along the sub-scanning direction may be faithfully laid out and displayed irrelevant to the size of the liquid crystal display 35 along the width direction thereof (i.e., main scanning direction). Conversely, a contour line indicative of a tape contour may be simultaneously displayed, although the complex process operation is required in this case.

In addition, in the aforesaid embodiment, the information about the half-tone dot meshing and the ruled line is not contained in the layout display. Alternatively, these decoration information may be represented as one line for clarifying a decoration information line extending along the sub-scanning direction.

Also, the print image is reduced along the sub-scanning direction in the above-described embodiment. Alternatively, since the size of the liquid crystal display along the main scanning direction does not constitute the major factor, no care should be taken in the relationship between the tape width and the width of the liquid crystal display. Therefore, the dot patterns for the respective lines stored in the dot expansion buffer 23a may be directly laid out and displayed at the fixed position along the main scanning direction. In other words, the dot pattern may be laid out and displayed without reducing the width along the sub-scanning direction. It should be understood that the expression "reduction" mentioned in the accompanying claims also implies such a case where the above-described print image reduction is not carried out.

As previously described in detail, in accordance with the present invention, the layout display is made irrelevant to the print image (layout) along the main scanning direction, and also the layout display is faithfully made with respect to the print image (mixed with character portion and background portion) along the sub-scanning direction. As a consequence, the layout image data processing operations can be simplified and the layout display can be executed at high speed.

What is claimed is:

1. A layout display apparatus for use in a tape printing apparatus for printing out a character string having more than one line of an inputted sentence on a tape, said layout display apparatus comprising:

reduction rate determining means for determining a reduction rate along a sub-scanning direction, the reduction rate being based on width of a tape loaded on said tape printing apparatus and a display width along a main scanning direction in a display area of the layout display apparatus;

table storing means for storing a table, the table indicating a relationship between a line number of said inputted sentence and display positions in which respective lines of said inputted sentence should be arranged along the main scanning direction on the display area;

display position determining means for (a) detecting the line number of said inputted sentence and (b) determining the display positions of the respective lines of said inputted sentence from the table based on the detected line number;

dot number determining means for determining dot numbers corresponding to lengths of rectangles along the sub-scanning direction, wherein the characters in each line of said inputted sentence are in the shape of the rectangles;

dot expansion means for expanding the respective lines of said inputted sentence to expanded dot patterns, the expanded dot patterns being based on a fixed dot number, which is determined irrespective to the shape of the respective characters along the main scanning direction, and said dot number determined by said dot number determining means along the sub-scanning direction;

display content storage means for (a) reducing said dot patterns of the respective lines, expanded by said dot expansion means, at the reduction rate determined by said reduction rate determining means, (b) arranging the reduced dot patterns of the respective lines on said display position as determined by said display position determining means, and (c) storing contents of the arranged and reduced dot patterns of the respective lines into a display buffer; and display means for displaying the contents of the arranged and reduced dot patterns stored in said display buffer on said display area.

2. A layout display apparatus according to claim 1, wherein:

said display content storage means subdivides said expanded dot patterns of the respective lines along the sub-scanning direction for every dot number represented by the inverse number of said reduction rate, to obtain subdivided dot pattern portions, said display content storage means converts each of the subdivided dot pattern positions into one dot to thereby reduce said expanded dot patterns of the respective lines along the sub-scanning direction, and said converted one dot is represented as a character when there is at least one dot indicative of the character in said subdivided dot pattern portion.

3. A layout display apparatus according to claim 1, further comprising tape width detecting means for detecting the width of the tape loaded on said tape printing apparatus, wherein said reduction rate determining means determines said reduction rate in accordance with the width of the tape determined by said tape width detecting means and the display width along the main scanning direction.

4. A layout display apparatus according to claim 2, further comprising tape width detecting means for detecting the width of the tape loaded on said tape printing apparatus, wherein said reduction rate determining means determines said reduction rate in accordance with the width of the tape determined by said tape width detecting means and the display width along the main scanning direction.

* * * * *

UNITED STATES PATENT AND TRADEMARK OFFICE
CERTIFICATE OF CORRECTION

PATENT NO. : 5,494,360
DATED : February 27, 1996
INVENTOR(S) : Kenji WATANABE; Yoshiya TOYOSAWA It is certified that error appears in the above-indentified patent and that said Letters Patent is hereby corrected as shown below:

Column 12, line 55, change "positions" to --portions--;

line 58, after "as" insert --a dot indicating--; and line 59, change "at least" to --even--.

Signed and Sealed this

Seventeenth Day of September, 1996

Attest:

BRUCE LEHMAN

Attesting Officer

Commissioner of Patents and Trademarks